United States Patent

Fox, II

[11] 3,811,563
[45] May 21, 1974

[54] PACKAGE STRUCTURE
[76] Inventor: William L. Fox, II, 35785 Restmore, Mt. Clemens, Mich. 48043
[22] Filed: July 3, 1972
[21] Appl. No.: 268,649

[52] U.S. Cl. ............... 206/459, 206/461, 206/813, 220/31 S, 220/60 R
[51] Int. Cl. ... B65d 43/10, B65d 43/16, B65d 73/00
[58] Field of Search ........ 206/78 R, 78 B, 79, 80 R, 206/80 A, DIG. 8, DIG. 18; 220/31 S, 60 R; 229/2.5; 248/205 A

[56] References Cited
UNITED STATES PATENTS
| | | | |
|---|---|---|---|
| 3,710,975 | 1/1973 | Jansen | 229/2.5 |
| 3,405,836 | 10/1968 | Regis, Jr. | 220/31 S X |
| 3,696,920 | 10/1972 | Lahay | 248/205 A X |
| 3,162,309 | 12/1964 | Kimbrough, Jr. | 206/80 R |
| 3,185,300 | 5/1965 | Potter | 206/80 A |
| 3,043,354 | 7/1962 | Fitzgerald | 220/31 S X |

*Primary Examiner*—William I. Price
*Assistant Examiner*—Steven E. Lipman
*Attorney, Agent, or Firm*—Whittemore, Hulbert & Belknap

[57] ABSTRACT

A key case for holding a second key having adhesive material on one surface thereof whereby the case may be attached to the underside of a vehicle hood or the like, which case includes an integral plastic hinge between the box and cover of the case and locking means between the other side of the box and cover whereby the cover is held in spaced apart relation with respect to the box on closing of the case, in conjunction with a display card for the case including a pair of parallel slots therein through which the hinge and locking means extend, with the cover on one side of the card and the box on the other side of the card.

6 Claims, 5 Drawing Figures

PATENTED MAY 21 1974 3,811,563

PACKAGE STRUCTURE

BACKGROUND OF THE INVENTION

1. Field of the Invention

The invention relates to package structure and refers more specifically to a plastic case for adhesively securing a second key to a vehicle or the like in combination with a display card to which the case may be secured by means of an integral plastic hinge and locking means on opposite sides of the box and cover of the case.

2. Description of the Prior Art

In the past, cases for securing second keys for vehicles such as automobiles, snowmobiles and the like about the vehicles, and for hiding second keys for house locks and the like, have generally been metal and have been secured to the vehicle, home or other structure with which the lock is associated by means of a magnet secured to the metal case. Such cases have been relatively expensive to construct, requiring shaping and securing together of the metal portions thereof and securing the magnet to the case. Further, such cases of the past have not been suitable for securing to the wood or brick of a house or non-ferrous portions of an automobile or snowmobile such as aluminum or plastic portions.

Further, the cases of the prior art as indicated above have not usually been suitable for convenient display and therefore have not been as commercial as desirable. Wherein such key cases of the past have been suitably displayed, the display has been expensive, requiring separate means for attaching the boxes to the display. Such separate display attaching means has increased the expense of the prior art articles.

SUMMARY OF THE INVENTION

In accordance with the invention, a plastic key case is formed including a box having an open top and a cover for the open top. An integral plastic hinge is provided between the cover and box at one side thereof, while locking means are provided at the other side of the cover and box. The hinge and locking means are adapted to hold the cover and box in slightly spaced apart relation with respect to each other. The case can then be secured to a display card having a pair of parallel slots therein spaced apart the width of the case by inserting the cover through one of the slots and closing the cover by extending the locking means through the other slot to secure the case to the card with the box on one side and the cover on the other side of the card.

DESCRIPTION OF THE PREFERRED EMBODIMENTS

Figure 2:
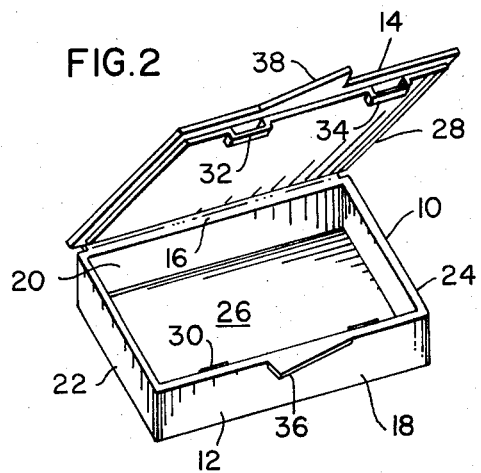
FIG. 2 is an enlarged perspective view of the key case of the invention.

As shown best in FIG. 2, the key case 10 includes the box 12 and a cover 14 connected along one side by an integral plastic strip or hinge 16.

More specifically, box 12 includes the opposite sides 18 and 20, the ends 22 and 24 and bottom 26. The top of the box 12 is open as best shown in FIG. 2.

The cover 14 is a generally rectangular panel which has the same outer periphery as the outer periphery of the box 12. The cover 14 is further provided with an upset portion 28 having a perimeter which parallels the outer perimeter of the cover but which is smaller in dimension than the outer perimeter of the cover by an amount slightly greater than the thickness of the sides and ends of the box 26. Thus, with the cover 14 closed on the box 12, the portion 28 of the cover 14 will fit within the open top of the box 12 and will be in spaced relation to the ends and sides of the box 12.

Both the box 12 and cover 14 are plastic. The hinge 16 is integral with the side 20 of the box 12 and the cover 14 and is a relatively thin plastic strip which provides a hinge action and holds the cover 14 in slightly spaced relation above the box 12 when the cover 14 is closed over the top of the box 12, as shown best in FIG. 3.

Figure 5:
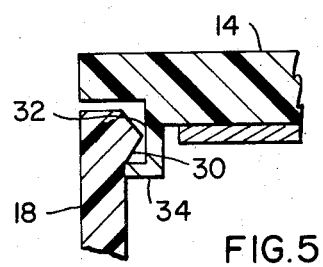
FIG. 5 is an enlarged partial section view of the key case and display card illustrated in FIG. 1, taken substantially on the line 5—5 in FIG. 1.

As shown best in FIG. 5, the box 12 is provided with projections 30 extending into the box from the top of the side 18. The cover 14 is provided with recesses 32 formed in abutments 34 thereon. The projections 30 and abutments 34 forming recesses 32 provide a locking mechanism between the cover 14 and box 12 at the top of the side 18 of the box when the cover is closed over the top of the box with the projections 30 cammed over the abutments 34 and held in the recesses 32.

Figure 1:
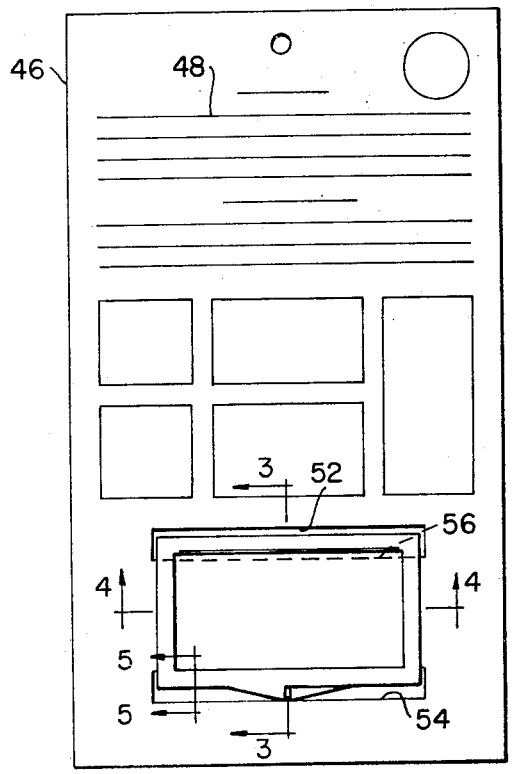
FIG. 1 is a plan view of the key case in combination with a display card in accordance with the invention.

The fins 36 and 38 disposed as shown best in FIGS. 1 and 2 are provided on the box 12 and cover 14, respectively, to facilitate applying an opening force to the cover 14 of the key case 10 with the cover closed whereby the projections 30 are cammed out of the recesses 32 over the abutments 34 and the key case 10 opened.

Figure 3:
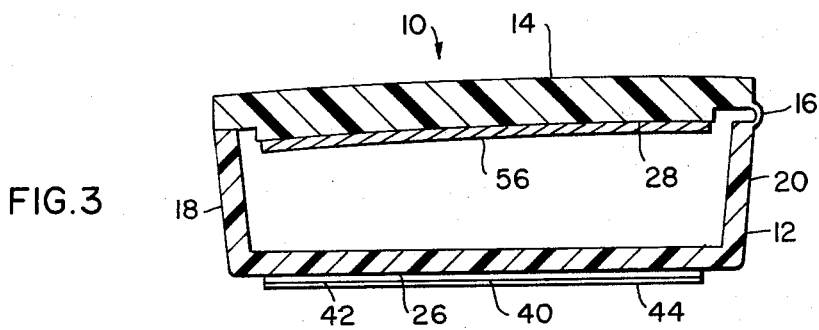
FIG. 3 is an enlarged section view of the combined key case and display card illustrated in FIG. 1, taken substantially on the line 3—3 in FIG. 1.
Figure 4:
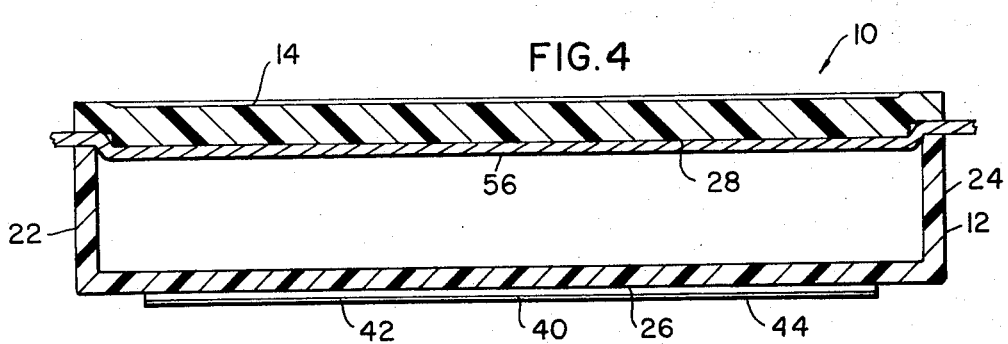
FIG. 4 is an enlarged section view of the display card and key case of FIG. 1, taken substantially on the line 4—4 in FIG. 1.

A strip of tape 40 is secured to the outside of the bottom 26 of the box 10 as shown best in FIGS. 3 and 4 by convenient means such as an appropriate adhesive. The tape 40 has adhesive on the surface 42 thereof which is covered by a removable waxed paper 44.

In use, the paper 44 is stripped from the tape 40 and the adhesive 42 is pressed onto any clean surface to secure the key case 10 in a desired location such as under the hood of an automobile or on the motor of a snowmobile, boat or the like.

The key case 10 so positioned offers the owner of the key a second chance to unlock the lock should an original key be lost or misplaced.

Due to the plastic construction of the key case and the particular design thereof, the case may be molded in a single operation. Further, the case can be readily manufactured in a choice of colors.

As shown in FIG. 1, the key case 10 is particularly adapted to be secured to a display card 46 having appropriate advertising written material 48 and pictures 50 thereon in the parallel slots 52 and 54. The slots 52 and 54 are spaced apart a distance substantially equal to the dimension of the key case 10 between the sides 12 and 18 thereof. The key case is secured to the display card 46 by opening the key case, inserting the cover through the slot 52 from the back of the case until the hinge 16 is in the slot 52. The cover is subsequently closed whereby the locking means including the projections 30 and recesses 32 extend through the slot 54 and lock the case 10 to the display card 46.

It will be particularly noted that the hinge 16 and the locking means including the projections 30 and abutments 34 having recesses 32 therein provide the spaced relation between the cover 14 and box 12 which permits the portion 56 of the display card 46 to extend between the box 12 and cover 14 with the cover closed and locked.

The upset portion 28 of the cover 14 and the slight difference in dimension between the inside perimeter of the top of the box 12 and the outside perimeter of the upset portion 28 of the cover 14 of the box 12 further aids in permitting the portion 56 of the display card 46 to pass between the box 12 and cover 14 without binding or seriously deforming the display card.

While one embodiment of the present invention has been considered in detail, it will be understood that other embodiments and modifications are contemplated. It is the intention to include all such modifications and embodiments as are defined by the appended claims within the scope of the invention.

I claim:

1. A key case for securing a spare automobile key or the like in any desired location comprising a plastic box having a bottom, a back wall, a front wall, and a pair of end walls, a plastic cover for the plastic box and a thin plastic hinge integral with the back wall of the box and the cover of the box at the upper edge of the back wall and the back edge of the cover, said cover having an upset portion extending into the box when the cover is closed terminating in spaced relation to the inside upper surface of the walls of the box, said hinge of the box spacing the ends of the cover of the box from the top of the end walls of the box with the cover closed on the box whereby the box may be secured to a cooperating display card having parallel openings for receiving the hinge and the front wall of the box, recesses in the front edge of the cover and projections extending inwardly of the box from the upper edge of the front wall of the box into the recesses in the cover of the box with the cover of the box closed, means for opening the cover of the box including a pair of oppositely disposed aligned triangular portions extending outwardly from one side of the box, one of which is secured to the cover and the other of which is secured to the upper edge of the front wall of the box and both of which extend outwardly of the box, and an adhesive material on the bottom of the box on the outer surface thereof and a strippable cover over the adhesive material whereby the key case may be secured in any desired location.

2. In combination, a display card for displaying a key case for retail merchandising comprising a substantially flat rectangular card having advertising material thereon and including means at one end thereof for hanging the card in a vertical position and a pair of parallel spaced apart slots in the card defining a card portion therebetween and a key case for carrying spare automobile keys and the like secured to the card including a box part having a bottom, a back side, a front side and two ends, a cover for the box, means hingedly securing the cover at one edge thereof to the upper edge of the back side of the box, said cover having an upset central portion on the inside surface thereof so that the upset portion extends into the box when the cover of the box is closed, which upset portion terminates inwardly of the inner surface of the walls of the box a distance at least equal to the thickness of the material of the card, said end walls and said back wall of said box terminating inwardly of the cover with the cover closed, said cover being on one side of the card, the body of the box being on the other side of the card with the hinge extending through one of the slots in the card and the cover closed on the box whereby the portion of the card is positioned within the box and extends out of both ends of the box between the cover and the top edges of the end walls of the box to secure the box on the card, and means operable between the front wall of the box and the cover of the box locking the cover of the box secured to the display card whereby the key case is secured to the display card.

3. Structure as set forth in claim 2 wherein the hinge is a living hinge constructed of a thin plastic strip integral with the box back wall and the cover of the key case.

4. Structure as set forth in claim 3 and further including an adhesive material on the outside surface of the bottom of the box and a strippable cover over the adhesive material whereby the key case may be secured in any desired location after removal from the display card.

5. Structure as set forth in claim 2 wherein the locking means comprises spaced apart recesses in the edge of the upset portion of the cover and projections extending inwardly of the box at the upper edge of the front wall of the box spaced apart to be aligned with the recesses in the cover on closing of the cover.

6. Structure as set forth in claim 2 and further including means for opening the key case comprising a substantially flat triangular projection on the cover of the key case and an oppositely disposed flat triangular projection on a wall of the key case adjacent the top thereof and in substantial alignment with the oppositely disposed triangular projection on the cover.

* * * * *